May 4, 1937.  J. S. BAKER  2,078,991
POLE CABLE TERMINAL
Filed July 20, 1934  3 Sheets-Sheet 1
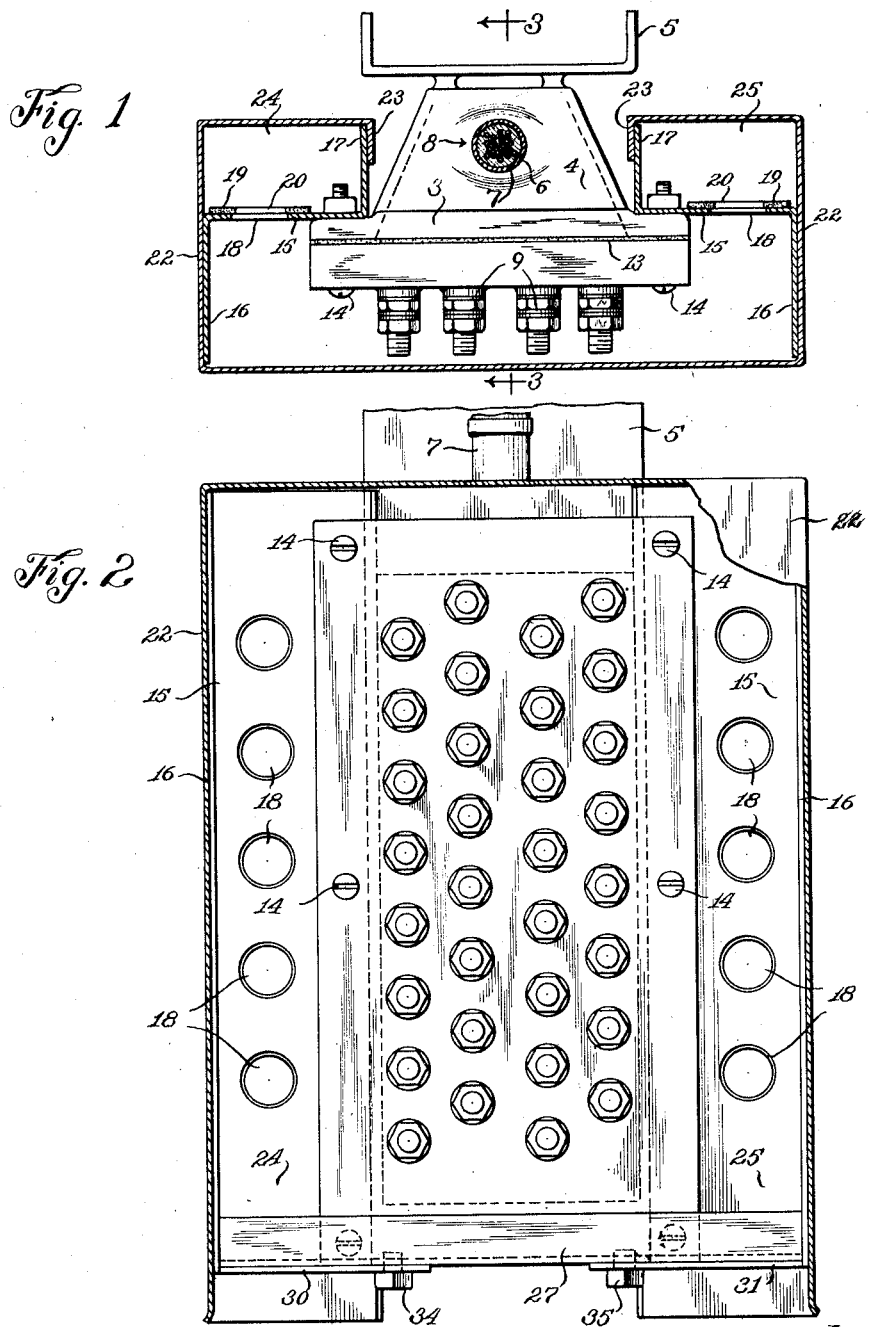
Inventor:
John S. Baker
By Jones, Addington, Ames + Seibold
Attys May 4, 1937.  J. S. BAKER  2,078,991
POLE CABLE TERMINAL
Filed July 20, 1934   3 Sheets-Sheet 2
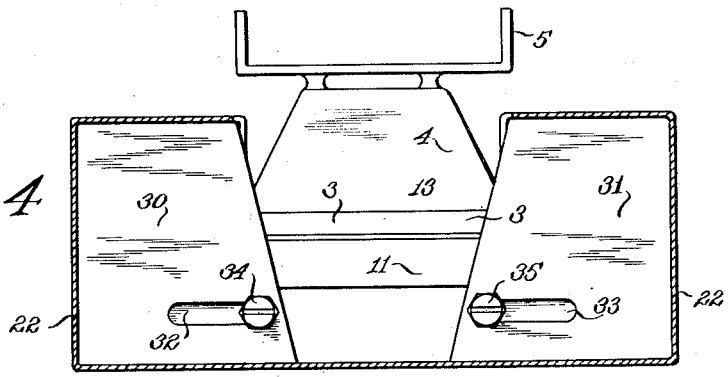
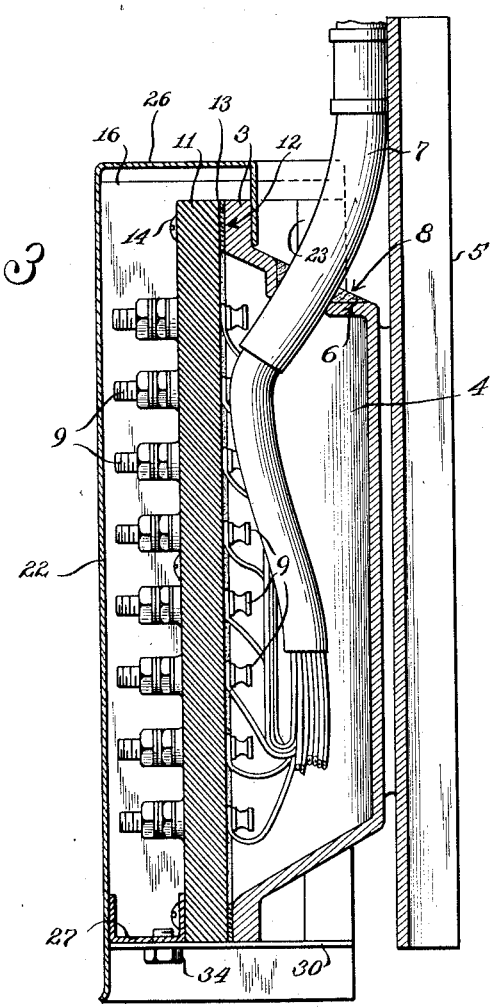
Inventor;
John S. Baker,
By Jones, Addington, Ames & Seibold
Attys.

May 4, 1937.  J. S. BAKER  2,078,991
POLE CABLE TERMINAL
Filed July 20, 1934   3 Sheets-Sheet 3

Inventor;
John S. Baker,
By Jones, Addington, Ames & Seibold
Attys.

Patented May 4, 1937

2,078,991

UNITED STATES PATENT OFFICE 2,078,991

POLE CABLE TERMINAL

John S. Baker, Chicago, Ill., assignor to Cook Electric Company, Chicago, Ill., a corporation of Illinois Application July 20, 1934, Serial No. 736,274

4 Claims. (Cl. 247—7)

My invention relates to cable terminal structures and more particularly to terminal boxes for electric cables adapted to be mounted on telephone poles and other supports carrying telephone line cables to provide ready connection to the drop wires leading to subscribers' instruments.

In terminals of this character, it is highly desirable to permit the drop wires to leave at the bottom, from conductor channels into which these drop wires enter, either through fanning strips, or directly, from terminal connections on a suitable contact mounting base. So far as I know, the practice among manufacturers has been to allow the end, out of which the drop wires lead, to remain open. Such a practice, however, is open to the disadvantage that the interior of the terminal box forms a desirable shelter for many kinds of birds, animals and insects, and affords a space into which dirt, rain, sleet and snow will blow and accumulate. My invention provides a novel design of terminal that permits the drop wires to leave the conductor channels, or the interior of the box, at the open end, but positively prohibits the entrance of undesirable foreign matters, thereby obviating the trouble heretofore experienced of short circuits and of the accumulations of dirt and other foreign matters that tend to build up short circuits across the various line connections in the box.

Excluding birds, animals and insects has been a real problem to users of cable terminals. During the day, the darkness of the interior of the terminal has provided a secluded spot for such animals as bats. During the night, the heat of the day has made the interior of the terminal a resting place for various small animals, such as lizards and the like. Certain locations have been annoyed so greatly by lizards, which are small and can find their way through extremely small spaces, that lines have been frequently short-circuited by lizards creeping through the open ends of the terminals and even through unfilled openings in fanning strips, only to crawl across the terminals of the base and establish a short circuit, the current, although small, being sufficient to cause electrocution and consequently a permanent lodging of the lizards across the terminals until removed. On the other hand, excretions of birds and other animals accumulating in the interior of the terminals have caused short-circuits across the lines. Snow, ice and rain have likewise caused much annoyance, and made the maintenance expense relatively high.

One of the objects of the invention resides, therefore, in the provision of means readily closing off the open end of the terminal and allowing any number of drop wires to be led thereoutof, without interference therewith, so that a simple, effective and easily operated sealing action may be obtained, at the open end, to guard against the undesirable and annoying entrance of foreign matter.

Cable terminal structures on the other hand must be simple, inexpensive and capable of excluding moisture at the terminal connections between the cable and drop wires when and where possible. A simple and inexpensive construction is desirable due to the number usually required. Moistureproof construction is preferable due to the exposure to which the terminal is subjected in use. My invention contemplates providing an exceedingly simple structure which effectively excludes moisture and which, as a rugged structure, is capable of weathering the elements throughout the year.

Other objects and advantages of the invention will be apparent from the following detailed description when taken in connection with the accompanying drawings which form a part hereof.

In the drawings:

Figure 1 is a top plan view of an assembled structure embodying the features of my invention, the cover and the side brackets being in section to show the interior thereof;

Fig. 2 is a front elevation of the same, the cover being partly broken away;

Fig. 3 is a vertical transverse section taken on line 3—3 of Fig. 1;

Fig. 4 is a bottom plan view illustrating the shutter or closure means employed to close the open end;

Figure 5:
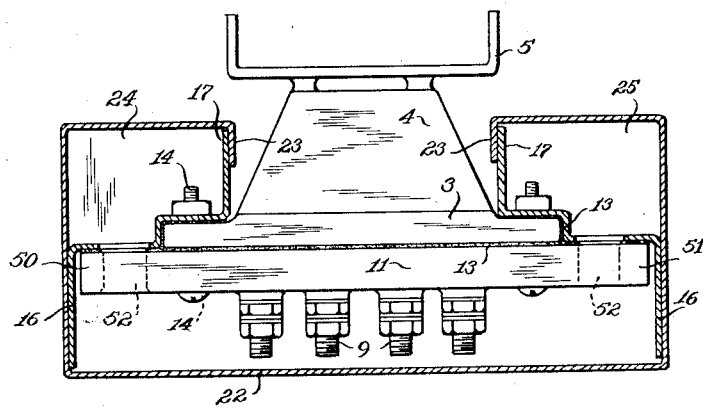
Fig. 5 is a view similar to Fig. 1, but illustrating an alternative embodiment of the invention.

Although it will be understood, the present invention is capable of application to any form or type of cable terminal box, the terminal box 1 is shown as comprising a housing, either as a casting, or of sheet metal, such as pressed steel, having a rear wall 3. This rear wall 3 is preferably formed with a cavity portion 4. Cavity 4 is located intermediate the ends of the rear wall, and its walls are formed with a slight taper away from the rear wall, as shown in Fig. 1, in the direction of a mounting bracket 5. The housing may be positioned upon mounting bracket 5 in any of the many well known ways, which mounting bracket may then be suitably fastened to the usual telephone pole or other support.

In the construction of the housing, a recess 6 may be provided. A cable 7 is adapted to enter the interior of the housing at cavity 4 through this recess. Solder 8 may then be puddled in this recess to form a tight connection between cable 7 and the housing. The cable may then extend along mounting 5 and may be firmly gripped by a strap 10 carried by the mounting bracket 5. The cable conductors enter cavity 4 and may be secured to contacts 9 extending to the rear face of a contact mounting plate 11 in any suitable manner, as by soldering the cable wires directly to the members of the binding posts. After the connections to this side of the binding post are completed, the cavity 4 may be filled with any suitable molten insulating compound which will harden upon cooling and which will serve to maintain these connections in proper arrangements and in proper moistureproof relation.

Rear wall 3 is preferably provided with a planar surface 12 surrounding cavity 4 to receive contact mounting plate 11 thereagainst, and so that a suitable sealing compound 13 may be inserted to provide a hermetical seal. If the housing is a casting, this planar surface 12 may be obtained by machining, and if the housing is of sheet metal, the planar surface 12 may be obtained by a proper drawing operation. Although the hermetical seal obtained by compound 13 between the planar surface 12 and the contact mounting plate 11 is quite desirable in a cable terminal construction so as to assure the moistureproof union, it will be understood the present invention is not necessarily limited to this feature.

The contact mounting plate 11 may also be mechanically secured to rear wall 3 by bolts 14. Side brackets 15 are also mounted in position by bolts 14 at the rear face and along opposite sides of rear wall 3. For the purposes of illustration only, I have shown brackets 15 substantially of Z cross-section, or as having forwardly and rearwardly extending flanges 16 and 17. A series of openings 18 are arranged in brackets 15 so that these brackets may form fanning strips, or if these brackets are to be considered each as an integral unit and of Z cross section, and with the flanges 16 and 17 as the outer legs thereof, the openings 18 may be provided in the intermediate portions so that these intermediate portions may be the fanning strips. A second strip 19 of a suitably soft material, such as fibre, and with slightly smaller openings 20 therein, may be secured to that portion of each of the brackets 15 comprising the fanning strip so that the drop wires leading from the subscribers' instruments will not be frayed by the sharp edges of openings 18.

A cover 22 in the form of a hood is adapted slidably to fit over the housing to cover at least one of the ends and the front side of the contact terminal base 11. Cover 22 is formed with inturned sides 23, which are adapted to slide along the outer face of flanges 17, when the cover is slipped down over the housing, this cover having an open space between the inturned sides 23, so that it will not interfere with the tapered portion of the housing. Flanges 16 also act as side guides for cover 22 when it is in position. On the other hand, flanges 17, together with brackets 15 forming the fanning strips cooperate with the cover 22 to provide conductor channels 24 and 25 on each side of and to the rear of rear wall 3. Cover 22 is closed at the top, as indicated at 26, to close off the upper open end of the cable terminal, and is open at the bottom to allow the drop lines from the subscribers' instruments to be led upwardly through conductor channels 24 and 25, and through the openings 18 and 20 of the fanning strips provided by brackets 15. Drop lines may then be extended across the front of the contact mounting base 11 and suitably connected with terminals 9 which extend through base 11 to its front face.

A channel iron 27 may also be provided across the face of base 11 at its lower end so that one leg of this channel 27 will act to guide the lower open end of cover 22. The lower open end of cover 22 is flared slightly to facilitate its handling when slipped into position or removed.

By referring now to Figs. 3 and 4, the closure means provided to close the lower open end of the cable terminal comprises a pair of shutters 30 and 31 having slots 32 and 33 therein. Bolts 34 and 35 are secured to channel member 27 and project through slots 32 and 33 to act as retaining means as well as guides for these shutters. Shutters 30 and 31 may be of any suitable form. However, their shape should permit them to cover the lower open end of conductor channels 24 and 25 without interfering with each other when they are opened. The installation of the cable terminal may require bringing the drop wires thereinto through one of the conductor channels only. In this case, the shutter on the opposite side will remain closed. However, both shutters may be moved far enough to open position to allow the requisite number of drop wires to be brought into both conductor channels 24 and 25 at the same time to meet the requirements of any installation of the cable terminal.

Figure 6:
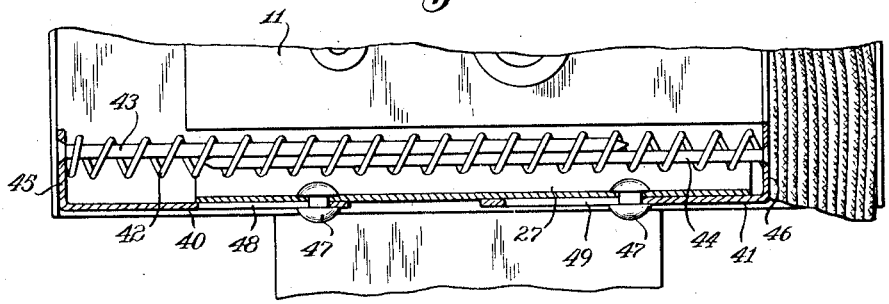
Fig. 6 is a detailed sectional view of a lower end, illustrating an alternative shutter construction which automatically tends to move to closed position.

In Fig. 6, the shutters 40 and 41 are provided with means automatically urging these shutters to closed position. Such means may comprise a spring 42 concentrically arranged about a pair of pins 43 and 44. Pin 43 may be anchored in an upstanding lip 45 of shutter 40. Pin 44 may be anchored in an upstanding lip 46 of shutter 41. Rivets 47 carried by angle member 27 secured to the outer face of contact plate 11 at its lower end may ride in slots 48 and 49 in shutters 40 and 41, respectively.

As illustrated in Fig. 6, drop wires may be led into the cable terminal, say only through one of the conductor channels and may not completely fill this conductor channel cross sectionally. Spring 42 will therefore urge the upstanding lip 46 of shutter 41 against the drop wires, whereby to bunch the same and allow the shutter 41 to close off the unoccupied space cross-sectionally of conductor channel 25.

It will be understood that the same action will be obtained when shutters 30 and 31 are used, because the lineman may push the shutters manually outwardly so as to cover the space unoccupied by the drop wires.

As previously stated above, bracket 15 may assume various forms in providing fanning strips for the cable terminal herein disclosed. To illustrate the range of construction contemplated by this invention, there is shown in Fig. 5 an alternative embodiment having the terminal plate 11 provided with its opposite sides 50 and 51 extending beyond the sides of rear wall 3. The extending portions 50 and 51 of terminal base 11 may be provided with holes 52 so that the former may serve as fanning strips between the contact base 11 and the conductor channels 24 and 25. Here also, the brackets 15 may be mechanically secured to the rear wall by bolts 14 and the forwardly and rearwardly extending flanges 16 and 17 positioned to receive cover 22 as it is slidably fitted over the sides and front of the housing.

It will be understood that in so far as the construction of flanges 16 and 17 are related to bracket 15, or are related either to contact base 11 or rear wall 3, they serve functionally merely to guide cover 22 in position, the flange 17 additionally serving in its cooperation with the cover 22 to provide the conductor channels 24 and 25. In this alternative embodiment shown in Fig. 5, the fanning strip perforations in bracket 15 may be slightly larger than the perforations 52 in the extended sides 50 and 51 of the contact base 11 so that if bracket 15 is made of metal or of harder material than contact plate 11, the sharp edges of the fanning strip openings in bracket 15 will not act to cut or otherwise wear the insulation of the drop wires.

It is apparent that the shutters are constructed to fit over the lower open end of the cable terminal and to close all or that portion of the open end that is not occupied by the drop wires. These shutters are easy to operate and by their use in the field, I have found that all problems of short circuits across the lines in the cable terminal have been solved. Vermin, birds and such animals as lizards can not find refuge in these boxes during the day or during the night. Their refuse, together with other dirt, cannot accumulate to cause short-circuiting. Snow, ice or rain will not enter. Dust and dirt will be held out. On the other hand, the brackets 15 are simple and inexpensive, but very aptly furnish the guiding supports for the cover as well as dividing the interior of the box into a front chamber and rear conductor channels for the drop lines.

Without further elaboration, the foregoing will so fully explain the gist of my invention that others may, by applying current knowledge, readily adopt the same for use under varying conditions of service, without eliminating certain features which may properly be said to constitute the essential items of novelty involved, which items are intended to be defined and secured to me by the following claims.

I claim:

1. A cable terminal box having conductor channels therein and a terminal base, mounting means therefor, a cover for conductor wires in said channels adapted to be attached to said terminal base, one end of said channels being open, and slidably mounted closure means for closing the open ends of said channels.

2. A cable terminal box having conductor channels therein and a terminal base, mounting means therefor, a cover, conductor wires in said channels adapted to be attached to said terminal base, one end of said channels being open, slidably mounted closure means for closing the open ends of said channels, and means for carrying said closure means at said open ends, said carrying means serving to close the open space between said cover and said terminal base adjacent said channel openings.

3. A cable terminal box comprising a terminal base, mounting means therefor, a cover, channels therein for conductor wires adapted for attachment to said terminal base, one end of said channels being open, shutters for said channel openings, and means for urging said shutters in closed position whereby to press against and bunch conductor wires passing through said openings and close the space unoccupied by said bunched conductor wires.

4. A cable terminal box comprising a terminal base, mounting means therefor, and a cover, there being an opening to receive conductor wires for attachment to said terminal base, and adjustable means for bunching the conductor wires passing through said opening and closing the space unoccupied by said bunched conductor wires.

JOHN S. BAKER.

CERTIFICATE OF CORRECTION.

Patent No. 2,078,991.  May 4, 1937.

JOHN S. BAKER.

It is hereby certified that error appears in the printed specification of the above numbered patent requiring correction as follows: Page 3, second column, line 11, claim 1, strike out the word "for" and insert a comma after "cover"; and that the said Letters Patent should be read with this correction therein that the same may conform to the record of the case in the Patent Office.

Signed and sealed this 29th day of June, A. D. 1937.

Henry Van Arsdale (Seal)

Acting Commissioner of Patents.